United States Patent Office 2,834,798
Patented May 13, 1958

---

2,834,798
HETEROCYCLIC PHOSPHORUS COMPOUNDS

Ingenuin Hechenbleikner, Clarksburg, Carl William Pause, Adams, and Francis C. Lanoue, North Adams, Mass., assignors to Shea Chemical Corporation, Jeffersonville, Ind., and Columbia, Tenn., a corporation of Tennessee No Drawing. Application December 20, 1957
Serial No. 704,004
25 Claims. (Cl. 260—461)

The present application is a continuation-in-part of application Serial No. 555,762, filed December 28, 1955; application Serial No. 631,046, filed December 28, 1956, and application Serial No. 635,148, filed January 22, 1957, the entire disclosures of which are hereby incorporated by reference.

This invention relates to the production of new organic derivatives of phosphorus and more particularly to the production of new cyclic derivatives of trivalent phosphorus.

It is an object of the present invention to provide stable, high-boiling, non-discoloring cyclic organic derivatives of trivalent phosphorus.

It is a further object of this invention to produce cyclic derivatives of trivalent phosphorus which possess good stabilizing action for resins.

Another object is the preparation of cyclic derivatives of trivalent phosphorus which are good antioxidants.

An additional object is to prepare a cyclic organic phosphite which is useful as an intermediate in the preparation of bromethylphenyl alkanephosphonates.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The objects are accomplished by the preparation of cyclic organic phosphites having the formula:

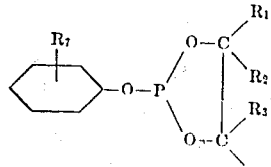

or

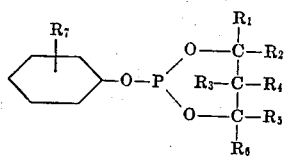

where $R_1$, $R_2$, $R_3$, $R_4$, $R_5$ and $R_6$ are the same or different and are hydrogen or lower alkyl group and $R_7$ is hydrogen, halogen, nitro, lower alkyl, cyclohexyl, nitro, alkoxy, naphthoxy and phenoxy. Generally no more than two halogen atoms or one nitro group is present on the aromatic ring as an $R_7$ substituent.

The compounds thus contain the 1,3,2-dioxaphospholane ring which has the following numbering system:

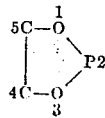

or the 1,3,2-dioxaphosphorinane ring which has the following numbering system:

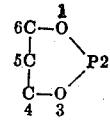

The preferred compound is hexylene phosphite (2-phenoxy-4,4,6-trimethyl-13,2-dioxaphosphorinane) which is of especial value as a gasoline additive. Ethylenephenyl phosphite (2-phenoxy-1,3,2-dioxaphospholane) also is one of the most valuable compounds of the instant invention although, as previously stated, hexylene phosphite is preferred.

Typical examples of dioxaphospholane compounds within the instant invention are ethylenephenyl phosphite; ethylene-2-chlorophenyl phosphite; ethylene-3-chlorophenyl phosphite; ethylene-4-chlorophenyl phosphite; ethylene-2,3-dichlorophenyl phosphite; ethylene-2,4-dichlorophenyl phosphite; ethylene-2,5-dichlorophenyl phosphite; ethylene-2,6-dichlorophenyl phosphite; ethylene-3,4-dichlorophenyl phosphite; ethylene-3,5-dichlorophenyl phosphite; ethylene-2-bromophenyl phosphite; ethylene-3-bromophenyl phosphite; ethylene-4-bromophenyl phosphite; ethylene-2-iodophenyl phosphite; and the corresponding 3- and 4-monoiodophenyl phosphites; ethylene-2-fluorophenyl phosphite (and the corresponding 3- and 4-monofluorophenyl phosphites), ethylene-2-chloro-4-bromophenyl phosphite; ethylene-2-methylphenyl phosphite; ethylene-3-methylphenyl phosphite; ethylene-4-methylphenyl phosphite; ethylene-3,5-dimethylphenyl phosphite, ethylene-2-ethylphenyl phosphite; ethylene-4-ethylphenyl phosphite; ethylene-2-hexyphenyl phosphite; ethylene-2-cyclohexylphenyl phospite; ethylene-4-octylphenyl phosphite; ethylene-3-isobutylphenyl phosphite; ethylene-2-dodecylphenyl phosphite; ethylene-2-methoxyphenyl phosphite; ethylene-3-methoxyphenyl phosphite; ethylene-4-methoxyphenyl phosphite; ethylene-2-ethoxyphenyl phosphite; ethylene-2-octoxyphenyl phosphite; ethylene-2-amylphenyl phosphite; ethylene-2-butylphenyl phosphite; ethylene-2-tertiary-butylphenyl phosphite; ethylene-2-secondary-butylphenyl phosphite; ethylene-2-phenoxy-phenyl phosphite; ethylene-2-alpha-naphthoxyphenyl phosphite; ethylene-2-beta-naphthoxyphenyl phosphite; ethylene-2-phenylphenyl phosphite; ethylene-alpha-naphthyl phosphite; ethylene-2-nitrophenyl phosphite; ethylene-3-nitrophenyl phosphite; ethylene-4-nitrophenyl phosphite; 1-methylethylenephenyl phosphite; 1-methylethylene-2-chlorophenyl phosphite; 1,2-dimethylethylene-phenyl phosphite; 1,2-dimethylethylene-3-chlorophenyl phosphite; 1-ethylethylenephenyl phosphite; 1,1,2,2-tetramethylethylenephenyl phosphite and 1-propylethylenephenyl phosphite.

Typical examples of dioxaphosphorinane compounds included within the instant invention are 2-phenoxy-1,3,2-dioxaphosphorinane; 2-phenoxy-4-methyl-1,3,2-dioxaphosphorinane; 2-phenoxy-5,5-dimethyl-1,3,2-dioxaphosphorinane; 2-phenoxy - 4,4,6 - trimethyl-1,3,2-dioxaphosphorinane; 2 - phenoxy-4-propyl-5-ethyl-1,3,2-dioxaphosphorinane; 2-phenoxy-4,6-dimethyl-1,3,2-dioxaphosphorinane; 2-phenoxy-4-ethyl-5-methyl-1,3,2-dioxaphosphorinane; 4-propyl-6-methyl - 1,3,2 - dioxaphosphorinane; 2-phenoxy-5,5-diethyl-1,3,2-dioxaphosphorinane; 2-phenoxy-5-ethyl-5-butyl-1,3,2-dioxaphosphorinane; 2-phenoxy - 4 - propyl-1,3,2-dioxaphosphorinane; 2-(2-chloro)phenoxy-4,4,6-trimethyl-1,3,2-dioxaphosphorinane; 2-(3-chloro)phenoxy-5,5-dimethyl-1,3,2-dioxaphosphorinane; 2-(4-chloro)phenoxy - 4 - methyl - 1,3,2 - dioxaphosphorinane; 2-(2,3-dichloro)phenoxy - 4 - methyl-1,3,2-dioxaphosphorinane; 2-(2,4-dichloro)phenoxy - 4 - methyl-1,3,2-dioxaphosphorinane; 2-(2,5-dichloro)phenoxy-4-methyl-1,3,2-dioxaphosphorinane; 2-(2,6-dichloro)phenoxy-4,4,6-trimethyl-1,3,2-dioxaphosphorinane; 2-(3,4 - dichloro)phenoxy-4,4,6-trimethyl-1,3,2-dioxaphosphorinane; 2-(3,5 - dichloro)phenoxy-4,4,6-trimethyl - 1,3,2 - dioxaphosphorinane; 2-(2-bromo)phenoxy - 4,4,6 - trimethyl-1,3,2-dioxaphosphorinane; 2-(3-bromo)phenoxy - 4 - methyl-1,3,2-dioxaphosphorinane; 2-(4-bromo)phenoxy - 4 - methyl-1,3,2-dioxaphosphorinane; 2-(4-iodo)phenoxy-4-methyl-1,3,2-dioxaphosphorinane; 2-(2-fluoro)phenoxy-4,4,6-trimethyl-1,3,2-dioxaphosphorinane; 2-(2-chloro-4-bromo)phenoxy-4,4,6-trimethyl - 1,3,2 - dioxaphosphorinane; 2-(2-methyl)phenoxy - 4,4,6 - trimethyl-1,3,2-dioxaphosphorinane; 2-(3-methyl)phenoxy-4-methyl-1,3,2 - dioxaphosphorinane; 2-(4-methyl)phenoxy - 4,4,6 - trimethyl - 1,3,2 - dioxaphosphorinane; 2-(3,5-dimethyl)phenoxy-4,4,6-trimethyl-1,3,2-dioxaphosphorinane; 2-(2-ethyl)phenoxy-4-methyl-1,3,2-dioxaphosphorinane; 2-(4-ethyl)phenoxy-4-methyl-1,3,2-dioxaphosphorinane; 2-(2-hexyl)phenoxy-4,4,6-trimethyl-1,3,2-dioxaphosphorinane; 2 - (2 - cyclohexyl)phenoxy-4-methyl-1,3,2-dioxaphosphorinane; 2-(4 - octyl)phenoxy-4,4,6-trimethyl-1,3,2-dioxaphosphorinane; 2-(3-isobutyl)phenoxy - 4 - methyl-1,3,2-dioxaphosphorinane; 2-(4-dodecyl)phenoxy-4-methyl-1,3,2-dioxaphosphorinane; 2-(2-amyl)phenoxy-4-methyl-1,3,2-dioxaphosphorinane; 2-(4-butyl)phenoxy-4-methyl-1,3,2-dioxaphosphorinane; 2-(2-tertiary-butyl)phenoxy - 4 - methyl-1,3,2-dioxaphosphorinane; 2-(2 - secondary-butyl)phenoxy-4-methyl-1,3,2-dioxaphosphorinane; 2-(2-nitro)phenoxy-4-methyl-1,3,2-dioxaphosphorinane; 2-(3 - nitro)phenoxy-4,4,6-trimethyl-1,3,2 - dioxaphosphorinane; 2-(4-nitro)phenoxy-4,4,6-trimethyl-1,3,2-dioxaphosphorinane.

The above compounds can be made by reacting equimolecular proportions of the appropriate primary aromatic dichloro phosphite with the appropriate glycol having adjacent hydroxyl groups in the case of the dioxaphospholanes and the appropriate glycol having one carbon atom between the two carbon atoms having the hydroxyl groups attached thereto in the case of the dioxaphosphorinanes in the presence of two mols of a tertiary base such as pyridine or triethylamine as a hydrogen chloride acceptor.

Typical examples of dichloro phosphites which can be used as starting materials in the present invention are phenyl dichlorophosphite; 2-chlorophenyl dichlorophosphite; 3-chlorophenyl dichlorophosphite; 4-chlorophenyl dichlorophosphite; 2,3-dichlorophenyl dichlorophosphite; 2,4-dichlorophenyl dichlorophosphite; 2,5-dichlorophenyl dichlorophosphite; 2,6-dichlorophenyl dichlorophosphite; 3,4-dichlorophenyl dichlorophosphite; 3,5-dichlorophenyl dichlorophosphite; 2-bromophenyl dichlorophosphite; 3-bromophenyl dichlorophosphite; 4-bromophenyl dichlorophosphite; 2-iodophenyl dichlorophosphite; 2-fluorophenyl dichlorophosphite; 2-chloro-4-bromophenyl dichlorophosphite; 2-methylphenyl dichlorophosphite; 3-methylphenyl dichlorophosphite; 4-methylphenyl dichlorophosphite; 3,5-dimethylphenyl dichlorophosphite; 2 - ethylphenyl dichlorophosphite; 4-ethylphenyl dichlorophosphite; 2-hexylphenyl dichlorophosphite; 2-cyclohexylphenyl dichlorophosphite; 4-octylphenyl dichlorophosphite; 3-isobutylphenyl dichlorophosphite; 2-dodecylphenyl dichlorophosphite; 2-methoxyphenyl dichlorophosphite; 3-methoxyphenyl dichlorophosphite; 4-methoxyphenyl dichlorophosphite; 2-ethoxyphenyl dichlorophosphite; 2-octoxyphenyl dichlorophosphite; 2-amylphenyl dichlorophosphite; 2-butylphenyl dichlorophosphite; 2-tertiary-butylphenyl dichlorophosphite; 2-secondary-butylphenyl dichlorophosphite; 2-phenoxyphenyl dichlorophosphite; 2-alpha-naphthoxyphenyl dichlorophosphite; 2-beta-naphthoxyphenyl dichlorophosphite; 2 - phenylphenyl dichlorophosphite; alpha-naphthyl dichlorophosphite; beta-naphthyl dichlorophosphite; 2-nitrophenyl dichlorophosphite; 3-nitrophenyl dichlorophosphite; 4-nitrophenyl dichlorophosphite; m-phenylene di(dichlorophosphite) and p-phenylene di(dichlorophosphite). Many of the above primary aromatic dichlorophosphites are old compounds and are shown, for example, in Kosolapoff, "Organophosphorus Compounds," on pages 199–200. Those which are new can be prepared by reacting the corersponding phenol with phosphorus trichloride in the manner set forth on page 180 of Kosolapoff, using equivalent amounts of the phenol and phosphorus trichloride.

As the glycol reactants there are employed vicinal glycols, e. g., ethylene glycol; 1,2-propylene glycol; 1,2-butylene glycol; 2,3-butylene glycol; 2,3-dimethyl-2,3-butanediol (pinacol); 1,2-pentanediol, as well as glycols having one carbon atom between the two carbon atoms having the hydroxyl groups attached thereto including 2-methyl-2,4-pentanediol (hexylene glycol); 1,3-butanediol (1,3-butylene glycol); 2,2-dimethyl-1,3-propanediol (neopentyl glycol); 2-ethyl-1,3-hexanediol; 2,4-pentanediol; 2-methyl-1,3-pentanediol; 2,4-heptanediol; 2-diethyl-1,3-propanediol; 2-ethyl-2-n-butyl-1,3-propanediol; and 1,3-propanediol.

The preferred method of preparing the compounds of the present invention, however, is by reacting triphenyl phosphite or an appropriately substituted triphenyl phosphite with the appropriate vicinal glycol, e. g., any of the glycols set forth previously.

The above compounds are preferably made by reacting triphenyl phosphite or substituted triphenyl phosphite with the appropriate glycol as above defined. As substituted triphenyl phosphites there can be used, for example, tris(2-methylphenyl)phosphite; tris(3-methylphenyl)phosphite; tris(4-methylphenyl)phosphite; tris(2-chlorophenyl)phosphite; tris(3-chlorophenyl)phosphite; tris(4 - chlorophenyl)phosphite; tris(2,3 - dichlorophenyl)phosphite; tris(2,4-dichlorophenyl)phosphite; tris(2,5-dichlorophenyl)phosphite; tris(2,6 - dichlorophenyl)phosphite; tris(3,4-dichlorophenyl)phosphite; tris(3,5,-dichlorophenyl)phosphite; tris(2-bromophenyl)phosphite; tris(3 - bromophenyl)phosphite; tri(4-bromophenyl)phosphite; tris(4-iodophenyl)phosphite; tri(2-fluorophenyl)phosphite; tri(2-chloro-4-bromophenyl)phosphite; tris(3,5-dimethylphenyl)phosphite; tris(2-ethylphenyl)phosphite; tris(4-ethylphenyl)phosphite; tris(2-cyclohexylphenyl)phosphite; tris(4-octylphenyl)phosphite; tris(3-isobutylphenyl)phosphite; tris(4 - dodecylphenyl)phosphite; tris(2-amylphenyl)phosphite; tris(4-butylphenyl)phosphite; tris(2-tertiary butylphenyl)phosphite; tris(2-secondary butylphenyl)phosphite; tris(2-nitrophenyl)phosphite; tris(3-nitrophenyl)phosphite; tris(4-nitrophenly)phosphite; tris(2-methoxyphenyl)phosphite; triphenylphenyl phosphite; tris(alpha-naphthyl)phosphite; tris(beta-naphthyl)phosphite; and tris-1-(2,4-dibromo)naphthyl phosphite. Most of these substituted triphenyl phosphites are old compounds. Those which are new can be formed in conventional fashion by refluxing the appropriate substituted phenol in excess with phosphorus trichloride, e. g., as shown in Kosolapoff, "Organophosphorus Compounds" (1950), page 183, and Moyle U. S. Patent No. 2,220,845. The preferred compound to use in the present invention is triphenyl phosphite itself.

In order to make the cyclic phosphites of the present invention, it is essential that there be used at least about one mol of the triphenyl phosphite for each mol of the glycol. The excess of the triphenyl phosphite can be as much as 100% or more molar excess, but generally there is no advantage in using more than a 25% molar excess of the phosphite. While it is possible to form the product of the present invention using as little as 0.9 mol of the triphenyl phosphite per mol of the glycol, this is not a preferred practice since the desired product is mixed with other non-cyclic products which are formed when the glycol is used in excess. When a large excess of the glycol is used, e. g., 2 or more mols of the glycol per mol of the triphenyl phosphite, none of the product of the present invention is formed.

The reaction between the glycol and the triphenyl phosphite is generally carried out at a temperature of 50 to 184° C. It has been found convenient to employ the temperature at which phenol distills at the pressure employed. The pressure employed can be atmospheric, superatmospheric or subatmospheric. Preferably, it is subatmospheric, e. g., 25 mm. or less.

It is also possible to carry the reaction out at atmospheric pressure, e. g., at 65° C., and then separate the desired glycol ester product from the phenol formed by distillation at reduced pressure, e. g., 1 mm.

While the reaction can be carried out without the aid of a catalyst, it has been found that often the yields are considerably improved by employing an alkaline catalyst which is strong enough to give a pH above 9 and preferably above 10. Typical catalysts are metallic sodium, metallic potassium, sodium hydroxide, potassium hydroxide, sodium phenate, potassium phenate, sodium ethylate, potassium alcoholate and other sodium and potassium alcoholates, strong organic bases such as guanidine, quaternary ammonium bases, e. g., tetramethylammonium hydroxide, etc. Usually between 0.001 and 0.20 mol, preferably about 0.01 to 0.05 mol of alkaline catalyst per mol of glycol is employed.

In place of an alkaline catalyst, it is sometimes desirable to employ a small amount of an acid catalyst, e. g., .001 to 0.2 mol of acid catalyst such as phosphoric acid, for example. Acid catalysts are recommended for use with compounds which are alkali-sensitive, while bases are recommended for compounds which are acid-sensitive. Thus, when employing a glycol having a tertiary hydroxy group, a base catalyst should be used.

The compounds of the present invention have numerous uses. Thus, they are effective plasticizers and stabilizers for vinyl chloride resins and other plastics. The compounds of the present invention can also be reacted with alkyl halides, more specifically alkyl bromides, to open the ring and form 2-bromalkylphenyl alkanephosphonates and 3-bromalkylphenyl alkanephosphonates, which latter compounds are useful as gasoline additives to prevent preignition, afterglow and deposits in the plugs. These haloethylphenyl alkanephosphonates also are useful as insecticides, e. g., they can be used to kill aphids, red spider mites, thrips, etc. As a specific example, 2-bromethylphenyl methanephosphonate can be prepared by mixing one mol of phenylethylene phosphite and 1.1 mols of methyl bromide in a closed vessel together with benzene in an amount equal to the weight of the methyl bromide and phenylethylene phosphite. The mixture was heated to start the exothermic reaction and the temperature then maintained at 110° C. for 60 minutes by the application of external cooling. The benzene and methyl bromide were then stripped off and the 2-bromethylphenyl methanephosphonate recovered in quantitative yields. Further details as to the preparation and use of 2-haloethylphenyl alkanephosphonates are found in Hechenbleikner application Serial No. 622,537, filed November 16, 1956, the entire disclosure of which is hereby incorporated by reference.

The compounds of the present invention can also be used to form other compounds wherein the phenoxy group is replaced by a lower alkoxy group by reaction with the appropriate alcohol. For example, 2 - phenoxy - 1,3,2 - dioxaphospholane (phenylethylene phosphite) can be reacted with an alkanol, e. g., methyl or butyl alcohol, in the presence of an alkaline catalyst to form 2 - methoxy - 1,3,2 - dioxaphospholane or 2 - butoxy - 1,3,2 - dioxaphospholane, while if 2 - phenoxy - 4 - methyl - 1,3,2 - dioxaphosphorinane is employed the products are 2 - methoxy - 4 - methyl - 1,3,2 - dioxaphosphorinane or 2 - butoxy - 4 - methyl - 1,3,2 - dioxaphosphorinane. This method of preparing 2 - alkoxy - 1,3,2 - dioxaphospholanes and 2 - alkoxy - 1,3,2 - dioxaphosphorinanes is often simpler and more economical than other methods of preparing these compounds.

It should be noted that the compounds of the present invention all have the phosphorus atom bonded through oxygen directly to a carbon atom of a benzene or substituted benzene ring, i. e., they are derivatives of phenol and not derivatives of aromatic alcohols such as benzyl alcohol, for example.

The differences between phenols, e. g., phenol per se, and aromatic alcohols, e. g., benzyl alcohol, in their properties are well recognized; thus, Wertheim, "Textbook of Organic Chemistry" 3rd edition (1951), page 553, states:

"Two distinct types of hydroxy compounds are possible in the aromatic series corresponding to the attachment of the OH group directly to the ring or to an alkyl side chain."

Similarly, Norris, "Principles of Organic Chemistry" (1931), page 439, states that the hydroxyl derivatives of the aromatic hydrocarbons may be sharply divided into two classes according to their chemical properties, benzyl alcohol being placed in one class and phenol in the other.

Likewise, Noller, "Chemistry of Organic Compounds" (1951), page 488, says:

"The phenols are compounds having a hydroxyl group attached directly to an aromatic nucleus. In general their methods of preparation and reaction differ from those of the alcohols."

On page 510 Noller points out that the aromatic alcohols, e. g., benzyl alcohol, are prepared by the same methods as the aliphatic alcohols and that they have generally the same reactions as the aliphatic alcohols.

The Van Nostrand Chemist's Dictionary (1953) under "alcohol" on page 17, states:

"The alkyl residue of the alcohol may be further substituted by aromatic nuclei, as in benzyl alcohol, $C_6H_5CH_2OH$ 

thus forming the alcoholic derivatives of the carbocyclic series, but the alcoholic hydroxyl may not be directly united to a carbon atom which is a member of the aromatic ring, because in that case the compound is considered a phenol, which has certain distinctive properties."

The Encyclopedia of Chemistry (1957), edited by George L. Clark, on page 102, states:

"Phenols are not similar to alcohols in properties. An example of an aromatic alcohol is benzyl alcohol $(C_6H_5CH_2OH)$."

This book on page 29 uses benzyl alcohol as an illustration of an aromatic alcohol.

The differences between the phenols and the aromatic alcohols carry over to their derivatives, as will be apparent in comparing compounds included in the present invention and having the formula:

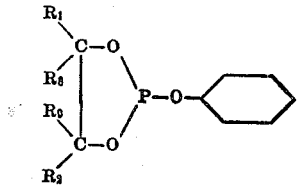

Type I with compounds outside the present invention and having the formula:

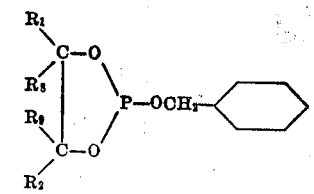

Type II where $R_1$, $R_2$, $R_8$ and $R_9$ are hydrogen or lower alkyl.

As previously pointed out, compounds of type I when reacted with an alkyl or aralkyl halide, e. g., methyl bromide or benzyl bromide, open the ring to form haloalkylphenyl alkanephosphonates, whereas compounds of Type II when reacted with the alkyl or aralkyl halide merely form a cyclic phosphonate without ring opening or addition of the halogen atom and with simultaneous elimination of the benzyl group as benzyl halide.

Also, upon reaction with hydrogen halides compounds of type I ring open with addition of the halogen to the compound in a manner similar to that when alkyl halides are employed. The phenoxy group is not attacked. Compounds of type II are hydrolyzed by hydrogen halides and benzyl alcohol is formed in the hydrolysis while halogen is not added to the compound.

Compounds of type I undergo ester interchange with aliphatic alcohols having lower boiling points than phenol, e. g., methyl and butyl alcohols, whereas compounds of type II will not undergo ester interchange with aliphatic alcohols having lower boiling points than benzyl alcohol.

Upon reaction with an acyl halide, compounds of type I will not split off phenyl halide (halobenzene) whereas in this reaction compounds of type II split off benzyl halide.

Compounds of type I are also more stable to oxidation than compounds of type II.

These differences all emphasize the difference between the bond of an oxygen atom directly to an aromatic ring carbon atom as in the phenoxy grouping present in the compounds of the present invention and the bond of an oxygen atom to an aliphatic carbon atom as in the benzyloxy grouping.

The differences between type I and type II compounds are further illustrated in reactions I to V below in which phenylethylene phosphite is compared with benzylethylene phosphite.

PHENYLETHYLENE PHOSPHITE AS OPPOSED TO BENZYLETHYLENE PHOSPHITE

I. Reaction with methyl bromide

A. BENZYLETHYLENE PHOSPHITE

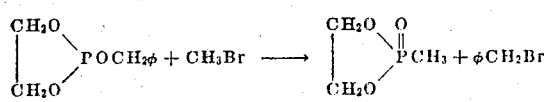

Reagents:

|  | Mols |
| --- | --- |
| Benzylethylene phosphite | 1 |
| Methyl bromide | 2 |

The reagents were mixed and heated in an autoclave to an initial temperature of 100° C. The reaction was exothermic, and the mixture was cooled to keep the temperature below 150° C. The mixture was then distilled at reduced pressure, and 0.9 mol of benzyl bromide distilled at 65° C./10 mm., and 0.9 mol of ethylene methanephosphonate distilled at 75° C./10 mm.

B. PHENYLETHYLENE PHOSPHITE AND METHYL BROMIDE

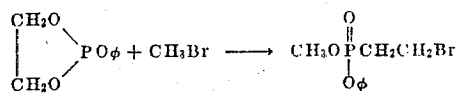

98% yield of 2-bromoethylphenyl methanephosphonate was obtained when the benzylethylene phosphite was replaced by phenylethylene phosphite.

II. Reaction with hydrogen chloride

A. BENZYLETHYLENE PHOSPHITE

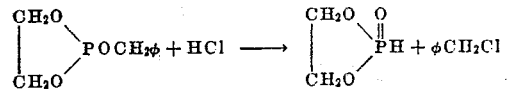

Reagents:

|  | Mol |
| --- | --- |
| Benzylethylene phosphite | 1 |
| Hydrogen chloride | 1 |

The phosphite was cooled to 20° C., and hydrogen chloride gas was passed into the solution until the theoretical amount had been adsorbed. The mixture was heated to 100° C. in an autoclave. On distillation of the reaction products, the following products were obtained:

Benzyl chloride ___ 0.85 mol, B. P. 60° C./15 mm.
Ethylene phosphite ___ 0.75 mol, B. P. 100° C./2 mm.

B. PHENYLETHYLENE PHOSPHITE

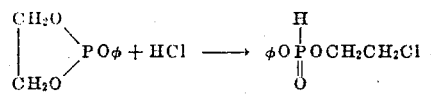

Reagents:

|  | Mol |
| --- | --- |
| Phenylethylene phosphite | 1 |
| Hydrogen chloride | 1 |

The reaction conditions were the same as for the benzylethylene phosphite reaction. After the correct amount of HCl adsorption, the mixture was heated to 100° C. in an autoclave. The product was then distilled at 1.5 mm. The yield was 0.95 mol of 2-chlorethylphenyl hydrogen phosphonate distilling at 120° C.

III. Reaction with diethyl dithiophosphoric acid

A. BENZYLETHYLENE PHOSPHITE

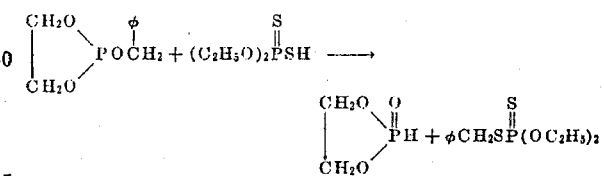

Reagents:

| Benzylethylene phosphite | mol | 1 |
| --- | --- | --- |
| O,O-diethyl dithiophosphoric acid | do | 1 |
| Toluene (solvent) | ml | 150 |

The reagents were mixed and heated under reflux (120° C.) for 15 minutes, and then the mixture was distilled at reduced pressure. After stripping the solvent, 0.93 mol of ethylene phosphite distilled 100° C./2 mm., and 0.90 mol O,O-diethyl-S-benzyl phosphorodithioate distilled at 150° C./2 mm.

B. PHENYLETHYLENE PHOSPHITE

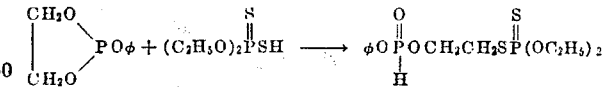

Reagents:

| Phenylethylene phosphite | mol | 1 |
| --- | --- | --- |
| O,O-diethyl dithiophosphoric acid | do | 1 |
| Toluene (solvent) | ml | 150 |

The reagents were mixed and heated under reflux for 15 minutes. The toluene was stripped, and the mixture heated to 180° C. at 1.1 mm. without any distillation occurring. The product was O,O-diethyl-S-ethylenephenyl hydrogen phosphonate phosphorodithioate of the indicated formula.

IV. Equilibrium reaction

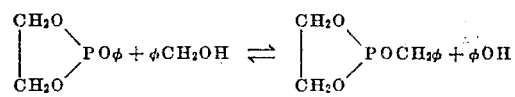

Reagents:

| Phenylethylene phosphite | mol | 1 |
| --- | --- | --- |
| Benzyl alcohol | do | 1 |
| Sodium | g | 0.5 |

The reagents were mixed and heated to 100° C. and allowed to react until an equilibrium was reached. After cooling, the mixture was washed with 10% sodium hydroxide at −5° to −10° C. The organic layer, upon distillation, yielded 0.86 mol of benzylethylene phosphite.

Since this reaction was under equilibrium conditions, it follows that when one mol of benzylethylene phosphite is reacted with one mol of phenol, the same results are obtained, i. e., the product contains 0.86 mol of benzylethylene phosphite.

V. *Relative rates of hydrolysis under identical conditions*

A. Phenylethylene phosphite, at 20° C., complete in 2 minutes

B. Benzylethylene phosphite, at 20° C., 11% in 10 minutes

Unless otherwise stated, all parts and percentages in the specification and claims are by weight.

In addition to the compounds having a single heterocyclic ring, there can be prepared compounds having the formula:

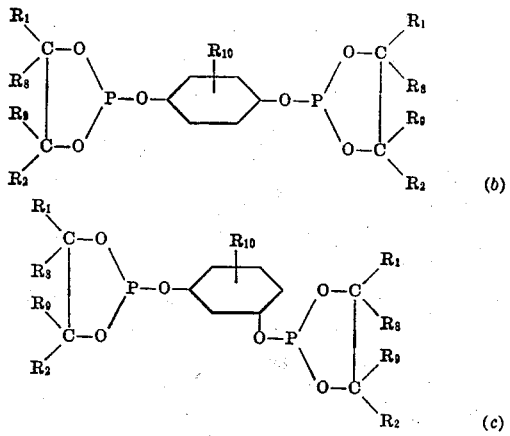

where $R_1$, $R_2$, $R_8$ and $R_9$ are the same or different and are hydrogen or lower alkyl and $R_{10}$ designates the groups attached to the phenylene nucleus and is hydrogen or one or more halogen, alkyl, nitro, alkoxy, aryloxy, aryl or cycloalkyl groups.

These compounds having two heterocyclic rings are made in the same manner as the compounds having a single heterocyclic ring except that it is necessary to use four mols of the glycol and four mols of the tertiary amine for each mol of the dichlorophenylene diphosphite.

EXAMPLE 1

One mol of ethylene glycol was mixed with two mols of pyridine in one liter of diethyl ether at room temperature and there was gradually added over a period of about ½ hour one mol of phenyl dichlorophosphite. When the addition was complete, the pyridine hydrochloride formed was filtered off and the solvent stripped off at atmospheric pressure. The residue was distilled at reduced pressure (about 0.5 mm.) and ethylenephenyl phosphite was obtained in a yield of about 85% of the theoretical. The ethylenephenyl phosphite was a colorless liquid and had a B. P. of 75° C. at 0.5 mm., $N_D^{25°}$ 1.53105; $d^{25}$ 1.230.

EXAMPLE 2

Example 1 was repeated using propylene glycol in place of ethylene glycol. The product obtained was propylenephenyl phosphite having the formula

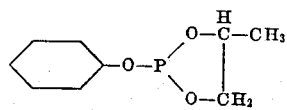

EXAMPLE 3

Example 1 was repeated using 2 mols of ethylene glycol, 4 mols of pyridine and one mol of p-phenylene di(dichlorophosphite). The product obtained had the formula

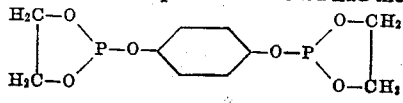

EXAMPLE 4

Example 3 was repeated replacing the p-phenylene di(dichlorophosphite) with m-phenylene di(dichlorophosphite) and the product obtained was

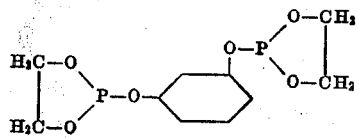

EXAMPLE 5

One mol of ethylene glycol was mixed with one mol of triphenyl phosphite in the presence of 0.17 mol of sodium. The mixture was heated to 130° C. at atmospheric pressure and then the phenol was distilled off under water vacuum pump pressure. After all of the phenol was collected, the water vacuum pump was replaced by a high vacuum pump and the distillation continued at about 0.5 mm. and the ethylenephenyl phosphite collected at a temperature of 75° C. in a yield approaching theoretical.

EXAMPLE 6

Example 5 was repeated omitting the sodium. The ethylenephenyl phosphite obtained was recovered and had a B. P. of 75° C. at 0.5 mm.

EXAMPLE 7

Example 5 was repeated using 1.25 mols of triphenyl phosphite in place of one mol of this material. The results obtained were substantially the same. The excess triphenyl phosphite was available as a heel for the next run.

EXAMPLE 8

| | Grams |
|---|---|
| 2-methyl-2,4-pentanediol (hexylene glycol) (1 mol) | 118 |
| Triphenyl phosphite (1.2 mols) | 372 |
| Metallic sodium (0.17 mol) | 4 |

The sodium was added to the hexylene glycol and heated to 95° C. to dissolve the sodium. The mixture was cooled to room temperature and then the triphenyl phosphite added. A slightly exothermic reaction was noted. The mixture was heated to 130° C. at atmospheric pressure. The pH was maintained between 9 and 10 and the phenol was distilled off under water pump vacuum. After all of the phenol was collected, the water vacuum pump was replaced by a high vacuum pump and the distillation continued until a pot temperature of 130° C. at about 1 mm. was reached. The reaction was not allowed to go above 130° C. at any time during the reaction.

2-phenoxy-4,4,6-trimethyl - 1,3,2 - dioxaphosphorinane having the formula

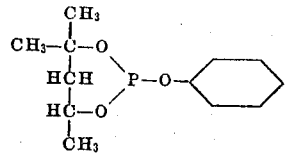

was obtained in a yield of 80% based on the amount of starting glycol during the vacuum distillation. This compound is a liquid having a boiling point of 95° C. at 1 mm., $n_D^{25}$ 1.51245 and $d_{15}^{25}$ 1.0934.

EXAMPLE 9

Example 8 was repeated using just one mol of triphenyl phosphite per mol of glycol. The 2-phenoxy-4,4,6-trimethyl-1,3,2-dioxaphosphorinane was obtained in good yields.

EXAMPLE 10

Example 8 was repeated but the high vacuum distillation was stopped when the head temperature reached 95° C. The residue was cooled to room temperature, 1% Hyflo (diatomaceous earth) was added and the mixture filtered to recover the cyclic product in purified form.

EXAMPLE 11

1,3-butanediol (1,3-butylene glycol) _____ mol __ 1
Triphenyl phosphite _____ do ____ 1
Sodium _____ gram __ 1

The triphenyl phosphite and glycol were mixed in a flask and the sodium added. The mixture was heated gradually upon an oil bath at 10–15 mm. pressure and the phenol distilled off through a small column. After the phenol was removed, the product distilled as a colorless liquid at 125–130° C. at 8 mm. The yield of 2-phenoxy-4-methyl-1,3,2-dioxaphorsphorinane of the formula

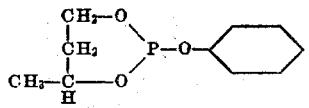

obtained was 71% of theoretical based on the glycol used. The product obtained had a $n_D^{25°}$ 1.515130 and $d_{15}^{25°}$ 1.178.

EXAMPLE 12

2,2-dimethyl-1,3-propanediol (neopentyl glycol) ____ Mol 1
Triphenyl phosphite _____ 1

The reagents were mixed and the phenol was stripped as in Example 11. Then the product was recovered by distillation at 90–95° C. at 1 mm. in a yield of 6 ounces (about 30% based on the glycol used).

The product was 2-phenoxy-5,5-dimethyl-1,3,2-dioxaphosphorinane having the formula

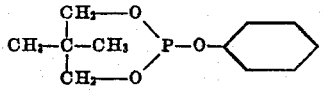

and having a $n_D^{25°}$ of 1.50375.

EXAMPLE 13

Example 12 was repeated but adding one gram of sodium in the same manner as in Example 11. The yields of the desired cyclic phosphite were much improved over those obtained in Example 12.

EXAMPLE 14

Ethylene glycol _____ mol __ 1
Tris(2-chlorophenyl) phosphite _____ do ____ 1
Sodium _____ gram __ 1

The process of Example 11 was repeated and ethylene-2-chlorophenyl phosphite recovered as the final product.

EXAMPLE 15

Ethylene glycol _____ mol __ 1
Tris(3-chlorophenyl) phosphite _____ do ____ 1
Sodium _____ gram __ 1

The process of Example 11 was repeated and ethylene-3-chlorophenyl phosphite recovered as the final product.

EXAMPLE 16

Ethylene glycol _____ mol __ 1
Tris(4-chlorophenyl) phosphite _____ do ____ 1
Sodium _____ gram __ 1

The process of Example 11 was repeated and ethylene-4-chlorophenyl phosphite recovered as the final product.

EXAMPLE 17

Ethylene glycol _____ mol __ 1
Tris(2,3-dichlorophenyl) phosphite _____ do ____ 1
Sodium _____ gram __ 1

The process of Example 11 was repeated and ethylene-2,3-dichlorophenyl phosphite recovered as the final product.

EXAMPLE 18

Ethylene glycol _____ mol __ 1
Tris(2,4-dichlorophenyl) phosphite _____ do ____ 1
Sodium _____ gram __ 1

The process of Example 11 was repeated and ethylene-2,4-dichlorophenyl phosphite recovered as the final product.

EXAMPLE 19

Ethylene glycol _____ mol __ 1
Tris(2,5-dichlorophenyl) phosphite _____ do ____ 1
Sodium _____ gram __ 1

The process of Example 11 was repeated and ethylene-2,5-dichlorophenyl phosphite recovered as the final product.

EXAMPLE 20

Ethylene glycol _____ mol __ 1
Tris(2,6-dichlorophenyl) phosphite _____ do ____ 1
Sodium _____ gram __ 1

The process of Example 11 was repeated and ethylene-2,6-dichlorophenyl phosphite recovered as the final product.

EXAMPLE 21

Ethylene glycol _____ mol __ 1
Tris(3,4-dichlorophenyl) phosphite _____ do ____ 1
Sodium _____ gram __ 1

The process of Example 11 was repeated and ethylene-3,4-dichlorophenyl phosphite recovered as the final product.

EXAMPLE 22

Ethylene glycol _____ mol __ 1
Tris(3,5-dichlorophenyl) phosphite _____ do ____ 1
Sodium _____ gram __ 1

The process of Example 11 was repeated and ethylene-3,5-dichlorophenyl phosphite recovered as the final product.

EXAMPLE 23

Ethylene glycol _____ mol __ 1
Tris(2-bromophenyl) phosphite _____ do ____ 1
Sodium _____ gram __ 1

The process of Example 11 was repeated and ethylene-2-bromophenyl phosphite recovered as the final product.

EXAMPLE 24

Ethylene glycol _____ mol __ 1
Tris(3-bromophenyl) phosphite _____ do ____ 1
Sodium _____ gram __ 1

The process of Example 11 was repeated and ethylene-3-bromophenyl phosphite recovered as the final product.

EXAMPLE 25

Ethylene glycol _____ mol __ 1
Tris(4-bromophenyl) phosphite _____ do ____ 1
Sodium _____ gram __ 1

The process of Example 11 was repeated and ethylene-4-bromophenyl phosphite recovered as the final product.

EXAMPLE 26

Ethylene glycol _____ mol __ 1
Tris(4-iodophenyl) phosphite _____ do ____ 1
Sodium _____ gram __ 1

The process of Example 11 was repeated and ethylene-4-iodophenyl phosphite recovered as the final product.

EXAMPLE 27

Ethylene glycol _____ mol __ 1
Tris(3-fluorophenyl) phosphite _____ do ____ 1
Sodium _____ gram __ 1

The process of Example 11 was repeated and ethylene-3-fluorophenyl phosphite recovered as the final product.

EXAMPLE 28

| | | |
|---|---|---|
| Ethylene glycol | mol | 1 |
| Tris(2-chloro-4-bromophenyl) phosphite | do | 1 |
| Sodium | gram | 1 |

The process of Example 11 was repeated and ethylene-2-chloro-4-bromophenyl phosphite recovered as the final product.

EXAMPLE 29

| | | |
|---|---|---|
| Ethylene glycol | mol | 1 |
| Tris(2-methylphenyl) phosphite | do | 1 |
| $H_3PO_4$ (100%) | gram | 1 |

The process of Example 11 was repeated and ethylene-2-methylphenyl phosphite recovered in 87% yield as the final product.

EXAMPLE 30

| | | |
|---|---|---|
| Ethylene glycol | mol | 1 |
| Tris(3-methylphenyl) phosphite | do | 1 |
| $H_3PO_4$ (100%) | gram | 1 |

The process of Example 11 was repeated and ethylene-3-methylphenyl phosphite recovered as the final product.

EXAMPLE 31

| | Mol |
|---|---|
| Ethylene glycol | 1 |
| Tris(3,5-dimethylphenyl) phosphite | 1 |

The process of Example 11 was repeated and ethylene-3,5-dimethylphenyl phosphite recovered as the final product.

EXAMPLE 32

| | Mol |
|---|---|
| Ethylene glycol | 1 |
| Tris(4-methylphenyl) phosphite | 1 |

The process of Example 11 was repeated and ethylene-4-methylphenyl phosphite recovered as the final product.

EXAMPLE 33

| | | |
|---|---|---|
| Ethylene glycol | mol | 1 |
| Tris(2-ethylphenyl) phosphite | do | 1 |
| $H_3PO_4$ (100%) | gram | 1 |

The proces of Example 11 was repeated and ethylene-2-ethylphenyl phosphite recovered as the final product.

EXAMPLE 34

| | Mol |
|---|---|
| Ethylene glycol | 1 |
| Tris(4-ethylphenyl) phosphite | 1 |

The process of Example 11 was repeated and ethylene-4-ethylphenyl phosphite recovered as the final product.

EXAMPLE 35

| | | |
|---|---|---|
| Ethylene glycol | mol | 1 |
| Tris(2-hexylphenyl) phosphite | do | 1 |
| $H_3PO_4$ (100%) | gram | 1 |

The process of Example 11 was repeated and ethylene-2-hexylphenyl phosphite recovered as the final product.

EXAMPLE 36

| | | |
|---|---|---|
| Ethylene glycol | mol | 1 |
| Tris(2-cyclohexylphenyl) phosphite | do | 1 |
| $H_3PO_4$ (100%) | gram | 1 |

The process of Example 11 was repeated and ethylene-2-cyclohexylphenyl phosphite recovered as the final product.

EXAMPLE 37

| | | |
|---|---|---|
| Ethylene glycol | mol | 1 |
| Tris(4-octylphenyl) phosphite | do | 1 |
| $H_3PO_4$ (100%) | gram | 1 |

The process of Example 11 was repeated and ethylene-4-octylphenyl phosphite recovered as the final product.

EXAMPLE 38

| | Mol |
|---|---|
| Ethylene glycol | 1 |
| Tris(3-isobutylphenyl) phosphite | 1 |

The process of Example 11 was repeated and ethylene-3-isobutylphenyl phosphite recovered as the final product.

EXAMPLE 39

| | | |
|---|---|---|
| Ethylene glycol | mol | 1 |
| Tris(2-dodecylphenyl) phosphite | do | 1 |
| $H_3PO_4$ (100%) | gram | 1 |

The process of Example 11 was repeated and ethylene-2-dodecylphenyl phosphite recovered as the final product.

EXAMPLE 40

| | | |
|---|---|---|
| Ethylene glycol | mol | 1 |
| Tris(2-methoxyphenyl) phosphite | do | 1 |
| Sodium | gram | 1 |

The process of Example 11 was repeated and ethylene-2-methoxyphenyl phosphite recovered as the final product.

EXAMPLE 41

| | | |
|---|---|---|
| Ethylene glycol | mol | 1 |
| Tris(3-methoxyphenyl) phosphite | do | 1 |
| Sodium | gram | 1 |

The process of Example 11 was repeated and ethylene-3-methoxyphenyl phosphite recovered as the final product.

EXAMPLE 42

| | | |
|---|---|---|
| Ethylene glycol | mol | 1 |
| Tris(4-methoxyphenyl) phosphite | do | 1 |
| Sodium | gram | 1 |

The process of Example 11 was repeated and ethylene-4-methoxyphenyl phosphite recovered as the final product.

EXAMPLE 43

| | | |
|---|---|---|
| Ethylene glycol | mol | 1 |
| Tris(2-ethoxyphenyl) phosphite | do | 1 |
| Sodium | gram | 1 |

The process of Example 11 was repeated and ethylene-2-ethoxyphenyl phosphite recovered as the final product.

EXAMPLE 44

| | | |
|---|---|---|
| Ethylene glycol | mol | 1 |
| Tris(2-octoxyphenyl) phosphite | do | 1 |
| Sodium | gram | 1 |

The process of Example 11 was repeated and ethylene-2-octoxyphenyl phosphite recovered as the final product.

EXAMPLE 45

| | | |
|---|---|---|
| Ethylene glycol | mol | 1 |
| Tris(2-amylphenyl) phosphite | do | 1 |
| Sodium | gram | 1 |

The process of Example 11 was repeated and ethylene-2-amylphenyl phosphite recovered as the final product.

EXAMPLE 46

| | | |
|---|---|---|
| Ethylene glycol | mol | 1 |
| Tris(2-butylphenyl) phosphite | do | 1 |
| Sodium | gram | 1 |

The process of Example 11 was repeated and ethylene-2-butylphenyl phosphite recovered as the final product.

EXAMPLE 47

| | | |
|---|---|---|
| Ethylene glycol | mol | 1 |
| Tris(2-tertiary-butylphenyl) phosphite | do | 1 |
| Sodium | gram | 1 |

The process of Example 11 was repeated and ethylene-2-tertiary-butylphenyl phosphite recovered as the final product.

EXAMPLE 48

| | | |
|---|---|---|
| Ethylene glycol | mol | 1 |
| Tris(2-secondary-butylphenyl) phosphite | do | 1 |
| Sodium | gram | 1 |

The process of Example 11 was repeated and ethylene-2-secondary-butylphenyl phosphite recovered as the final product.

EXAMPLE 49

| | | |
|---|---|---|
| Ethylene glycol | mol | 1 |
| Tris(2-phenoxyphenyl) phosphite | do | 1 |
| Sodium | gram | 1 |

The process of Example 11 was repeated and ethylene-2-phenoxyphenyl phosphite recovered as the final product.

EXAMPLE 50

| | | |
|---|---|---|
| Ethylene glycol | mol | 1 |
| Tris(2-α-naphthoxyphenyl) phosphite | do | 1 |
| Sodium | gram | 1 |

The process of Example 11 was repeated and ethylene-2-α-naphthoxyphenyl phosphite recovered as the final product.

EXAMPLE 51

| | | |
|---|---|---|
| Ethylene glycol | mol | 1 |
| Tris(2-β-naphthoxyphenyl)phosphite | do | 1 |
| Sodium | gram | 1 |

The process of Example 11 was repeated and ethylene-2-β-naphthoxyphenyl phosphite recovered as the final product.

EXAMPLE 52

| | | |
|---|---|---|
| Ethylene glycol | mol | 1 |
| Tris(2-phenylphenyl) phosphite | do | 1 |
| Sodium | gram | 1 |

The process of Example 11 was repeated and ethylene-2-phenylphenyl phosphite recovered as the final product.

EXAMPLE 53

| | | |
|---|---|---|
| Ethylene glycol | mol | 1 |
| Tris(2-nitrophenyl) phosphite | do | 1 |
| Sodium | gram | 1 |

The process of Example 11 was repeated and ethylene-2-nitrophenyl phosphite recovered as the final product.

EXAMPLE 54

| | | |
|---|---|---|
| Ethylene glycol | mol | 1 |
| Tris(3-nitrophenyl) phosphite | do | 1 |
| Sodium | gram | 1 |

The process of Example 11 was repeated and ethylene-3-nitrophenyl phosphite recovered as the final product.

EXAMPLE 55

| | | |
|---|---|---|
| Ethylene glycol | mol | 1 |
| Tris(4-nitrophenyl) phosphite | do | 1 |
| Sodium | gram | 1 |

The process of Example 11 was repeated and ethylene-4-nitrophenyl phosphite recovered as the final product.

EXAMPLE 56

| | | |
|---|---|---|
| 2,3-butylene glycol | mol | 1 |
| Triphenyl phosphite | do | 1 |
| Sodium | gram | 1 |

The process of Example 11 was repeated and 1,2-dimethylethylenephenyl phosphite recovered as the final product.

EXAMPLE 57

| | | |
|---|---|---|
| 1,2-propylene glycol | mol | 1 |
| Tris(2-chlorophenyl) phosphite | do | 1 |
| Sodium | gram | 1 |

The process of Example 11 was repeated and 1-methyl-ethylene-2-chlorophenyl phosphite recovered as the final product.

EXAMPLE 58

| | | |
|---|---|---|
| 1,2-butylene glycol | mol | 1 |
| Triphenyl phosphite | do | 1 |
| Sodium | gram | 1 |

The process of Example 11 was repeated and 1-ethyl-ethylenephenyl phosphite recovered as the final product.

EXAMPLE 59

| | | |
|---|---|---|
| 1,2-pentanediol | mol | 1 |
| Triphenyl phosphite | do | 1 |
| Sodium | gram | 1 |

The process of Example 11 was repeated and 1-propyl-ethylenephenyl phosphite recovered as the final product.

EXAMPLE 60

| | | |
|---|---|---|
| Trimethylene glycol (1,3-propanediol) | mol | 1 |
| Triphenyl phosphite | do | 1 |
| Sodium | gram | 1 |

The process of Example 11 was repeated and 2-phenoxy-1,3,2-dioxaphosphorinane recovered as the final product.

EXAMPLE 61

| | | |
|---|---|---|
| 2-ethyl-1,3-hexanediol | mol | 1 |
| Triphenyl phosphite | do | 1 |
| Sodium | gram | 1 |

The process of Example 11 was repeated and 2-phenoxy-4-propyl-5-ethyl-1,3,2-dioxaphosphorinane was recovered as the final product.

EXAMPLE 62

| | | |
|---|---|---|
| 2,4-pentanediol | mol | 1 |
| Triphenyl phosphite | do | 1 |
| Sodium | gram | 1 |

The process of Example 11 was repeated and 2-phenoxy-4,6-dimethyl-1,3,2-dioxaphosphorinane recovered as the final product.

EXAMPLE 63

| | | |
|---|---|---|
| 2-ethyl-1,3-butanediol | mol | 1 |
| Triphenyl phosphite | do | 1 |
| Sodium | gram | 1 |

The process of Example 11 was repeated and 2-phenoxy-4-ethyl-5-methyl-1,3,2-dioxaphosphorinane recovered as the final product.

EXAMPLE 64

| | | |
|---|---|---|
| 2,4-heptanediol | mol | 1 |
| Triphenyl phosphite | do | 1 |
| Sodium | gram | 1 |

The process of Example 11 was repeated and 2-phenoxy-4-propyl-6-methyl-1,3,2-dioxaphosphorinane recovered as the final product.

EXAMPLE 65

| | | |
|---|---|---|
| 2,2-diethyl-1,3-propanediol | mol | 1 |
| Triphenyl phosphite | do | 1 |
| Sodium | gram | 1 |

The process of Example 11 was repeated and 2-phenoxy-5,5-diethyl-1,3,2-dioxaphosphorinane recovered as the final product.

EXAMPLE 66

| | | |
|---|---|---|
| 2-ethyl-2-butyl-1,3-propanediol | mol | 1 |
| Triphenyl phosphite | do | 1 |
| Sodium | gram | 1 |

The process of Example 11 was repeated and 2-phenoxy-5-ethyl-5-butyl-1,3,2-dioxaphosphorinane recovered as the final product.

EXAMPLE 67

1,3-hexanediol _____ mol __ 1
Triphenyl phosphite _____ do ____ 1
Sodium _____ gram __ 1

The process of Example 11 was repeated and 2-phenoxy-4-propyl-1,3,2-dioxaphosphorinane recovered as the final product.

EXAMPLE 68

2-methyl-2,4-pentanediol _____ mol __ 1
Tris(2-chlorophenyl) phosphite _____ do ____ 1
Sodium _____ gram __ 1

The process of Example 11 was repeated and 2-(2-chloro)phenoxy-4,4,6-trimethyl-1,3,2-dioxaphosphorinane recovered as the final product.

EXAMPLE 69

2,2-dimethyl-1,3-propanediol _____ mol __ 1
Tris(3-chlorophenyl) phosphite _____ do ____ 1
Sodium _____ gram __ 1

The process of Example 11 was repeated and 2-(3-chloro)phenoxy-5,5-dimethyl-1,3,2-dioxaphosphorinane recovered as the final product.

EXAMPLE 70

1,3-butylene glycol _____ mol __ 1
Tris(4-chlorophenyl) phosphite _____ do ____ 1
Sodium _____ gram __ 1

The process of Example 11 was repeated and 2-(4-chloro)phenoxy-4-methyl-1,3,2-dioxaphosphorinane recovered as the final product.

EXAMPLE 71

1,3-butylene glycol _____ mol __ 1
Tris(2,3-dichlorophenyl) phosphite _____ do ____ 1
Sodium _____ gram __ 1

The process of Example 11 was repeated and 2-(2,3-dichloro)phenoxy-4-methyl-1,3,2-dioxaphosphorinane recovered as the final product.

EXAMPLE 72

1,3-butylene glycol _____ mol __ 1
Tris(2,4-dichlorophenyl) phosphite _____ do ____ 1
Sodium _____ gram __ 1

The process of Example 11 was repeated and 2(2,4-dichloro)phenoxy-4-methyl-1,3,2-dioxaphosphorinane recovered as the final product.

EXAMPLE 73

1,3-butylene glycol _____ mol __ 1
Tris(2,5-dichlorophenyl) phosphite _____ do ____ 1
Sodium _____ gram __ 1

The process of Example 11 was repeated and 2-(2,5-dichloro)phenoxy-4-methyl-1,3,2-dioxaphosphorinane recovered as the final product.

EXAMPLE 74

2-methyl-2,4-pentanediol _____ mol __ 1
Tris(2,6-dichlorophenyl) phosphite _____ do ____ 1
Sodium _____ gram __ 1

The process of Example 11 was repeated and 2-(2,6-dichloro)phenoxy-4,4,6-trimethyl-1,3,2-dioxaphosphorinane recovered as the final product.

EXAMPLE 75

2-methyl-2,4-pentanediol _____ mol __ 1
Tris(3,4-dichlorophenyl) phosphite _____ do ____ 1
Sodium _____ gram __ 1

The process of Example 11 was repeated and 2-(3,4-dichloro)phenoxy-4,4,6-trimethyl-1,3,2-dioxaphosphorinane recovered as the final product.

EXAMPLE 76

2-methyl-2,4-pentanediol _____ mol __ 1
Tris(3,5-dichlorophenyl) phosphite _____ do ____ 1
Sodium _____ gram __ 1

The process of Example 11 was repeated and 2-(3,5-dichloro)phenoxy-4,4,6-trimethyl-1,3,2-dioxaphosphorinane recovered as the final product.

EXAMPLE 77

2-methyl-2,4-pentanediol _____ mol __ 1
Tris(2-bromophenyl) phosphite _____ do ____ 1
Sodium _____ gram __ 1

The process of Example 11 was repeated and 2-(2-bromo)phenoxy-4,4,6-trimethyl-1,3,2-dioxaphosphorinane recovered as the final product.

EXAMPLE 78

1,3-butylene glycol _____ mol __ 1
Tris(3-bromophenyl) phosphite _____ do ____ 1
Sodium _____ gram __ 1

The process of Example 11 was repeated and 2-(3-bromo)phenoxy-4-methyl-1,3,2-dioxaphosphorinane recovered as the final product.

EXAMPLE 79

1,3-butylene glycol _____ mol __ 1
Tris(4-bromophenyl) phosphite _____ do ____ 1
Sodium _____ gram __ 1

The process of Example 11 was repeated and 2-(4-bromo)phenoxy-4-methyl-1,3,2-dioxaphosphorinane recovered as the final product.

EXAMPLE 80

1,3-butylene glycol _____ mol __ 1
Tris(4-iodophenyl) phosphite _____ do ____ 1
Sodium _____ gram __ 1

The process of Example 11 was repeated and 2-(4-iodo)phenoxy-4-methyl-1,3,2-dioxaphosphorinane recovered as the final product.

EXAMPLE 81

2-methyl-2,4-pentanediol _____ mol __ 1
Tris(2-fluorophenyl) phosphite _____ do ____ 1
Sodium _____ gram __ 1

The process of Example 11 was repeated and 2-(4-fluoro)phenoxy-4,4,6-trimethyl-1,3,2-dioxaphosphorinane recovered as the final product.

EXAMPLE 82

2-methyl-2,4-pentanediol _____ mol __ 1
Tris(2-chloro-4-bromophenyl) phosphite _____ do ____ 1
Sodium _____ gram __ 1

The process of Example 11 was repeated and 2-(2-chloro-4-bromo)phenoxy-4,4,6-trimethyl-1,3,2-dioxaphosphorinane recovered as the final product.

EXAMPLE 83

2-methyl-2,4-pentanediol _____ mol __ 1
Tris(2-methylphenyl) phosphite _____ do ____ 1
Sodium _____ gram __ 1

The process of Example 11 was repeated and 2(2-methyl)phenoxy-4,4,6-trimethyl-1,3,2-dioxaphosphorinane recovered as the final product.

EXAMPLE 84

1,3-butylene glycol _____ mol __ 1
Tris(3-methylphenyl) phosphite _____ do ____ 1
Sodium _____ gram __ 1

The process of Example 11 was repeated and 2-(3-methyl)phenoxy-4-methyl-1,3,2-dioxaphosphorinane recovered as the final product.

EXAMPLE 85

2-methyl-2,4-pentanediol _____ mol __ 1
Tris(4-methylphenyl) phosphite _____ do ____ 1
Sodium _____ gram __ 1

The process of Example 11 was repeated and 2-(4-methyl)phenoxy - 4,4,6 - trimethyl - 1,3,2 - dioxaphosphorinane recovered as the final product.

EXAMPLE 86

| | | |
|---|---|---|
| 2-methyl-2,4-pentanediol | mol | 1 |
| Tris(3,5-dimethylphenyl) phosphite | do | 1 |
| Sodium | gram | 1 |

The process of Example 11 was repeated and 2-(3,5-dimethyl)phenoxy - 4,4,6 - trimethyl - 1,3,2 - dioxaphosphorinane recovered as the final product.

EXAMPLE 87

| | | |
|---|---|---|
| 1,3-butylene glycol | mol | 1 |
| Tris(2-ethylphenyl) phosphite | do | 1 |
| Sodium | gram | 1 |

The process of Example 11 was repeated and 2-(2-ethyl)phenoxy - 4 - methyl - 1,3,2 - dioxaphosphorinane recovered as the final product.

EXAMPLE 88

| | | |
|---|---|---|
| 1,3-butylene glycol | mol | 1 |
| Tris(4-ethylphenyl) phosphite | do | 1 |
| Sodium | gram | 1 |

The process of Example 11 was repeated and 2-(4-ethyl)phenoxy - 4 - methyl - 1,3,2 - dioxaphosphorinane recovered as the final product.

EXAMPLE 89

| | | |
|---|---|---|
| 2-methyl-2,4-pentanediol | mol | 1 |
| Tris(2-hexylphenyl) phosphite | do | 1 |
| Sodium | gram | 1 |

The process of Example 11 was repeated and 2-(2-hexyl)phenoxy - 4,4,6 - trimethyl - 1,3,2 - dioxaphosphorinane recovered as the final product.

EXAMPLE 90

| | | |
|---|---|---|
| 1,3-butylene glycol | mol | 1 |
| Tris(2-cyclohexylphenyl) phosphite | do | 1 |
| Sodium | gram | 1 |

The process of Example 11 was repeated and 2-(2-cyclohexyl)phenoxy - 4 - methyl - 1,3,2 - dioxaphosphorinane recovered as the final product.

EXAMPLE 91

| | | |
|---|---|---|
| 2-methyl-2,4-pentanediol | mol | 1 |
| Tris(4-octylphenyl) phosphite | do | 1 |
| Sodium | gram | 1 |

The process of Example 11 was repeated and 2-(4-octyl)phenoxy - 4,4,6 - trimethyl - 1,3,2 - dioxaphosphorinane recovered as the final product.

EXAMPLE 92

| | | |
|---|---|---|
| 1,3-butylene glycol | mol | 1 |
| Tris(3-isobutylphenyl) phosphite | do | 1 |
| Sodium | gram | 1 |

The process of Example 11 was repeated and 2-(3-isobutyl)phenoxy-4-methyl-1,3,2-dioxaphosphorinane recovered as the final product.

EXAMPLE 93

| | | |
|---|---|---|
| 1,3-butylene glycol | mol | 1 |
| Tris(4-dodecylphenyl) phosphite | do | 1 |
| Sodium | gram | 1 |

The process of Example 11 was repeated and 2-(4-dodecyl)phenoxy-4-methyl-1,3,2-dioxaphosphorinane recovered as the final product.

EXAMPLE 94

| | | |
|---|---|---|
| 1,3-butylene glycol | mol | 1 |
| Tris(2-amylphenyl) phosphite | do | 1 |
| Sodium | gram | 1 |

The process of Example 11 was repeated and 2-(2-amyl)phenoxy-4-methyl-1,3,2-dioxaphosphorinane recovered as the final product.

EXAMPLE 95

| | | |
|---|---|---|
| 1,3-butylene glycol | mol | 1 |
| Tris(4-butylphenyl) phosphite | do | 1 |
| Sodium | gram | 1 |

The process of Example 11 was repeated and 2-(4-butyl)phenoxy-4-methyl-1,3,2-dioxaphosphorinane recovered as the final product.

EXAMPLE 96

| | | |
|---|---|---|
| 1,3-butylene glycol | mol | 1 |
| Tris(2-tertiary-butylphenyl) phosphite | do | 1 |
| Sodium | gram | 1 |

The process of Example 11 was repeated and 2-(2-tertiary butyl)phenoxy-4-methyl-1,3,2-dioxaphosphorinane recovered as the final product.

EXAMPLE 97

| | | |
|---|---|---|
| 1,3-butylene glycol | mol | 1 |
| Tris(2-secondary-butylphenyl) phosphite | do | 1 |
| Sodium | gram | 1 |

The process of Example 11 was repeated and 2-(2-secondary butyl)phenoxy - 4 - methyl - 1,3,2 - dioxaphosphorinane recovered as the final product.

EXAMPLE 98

| | | |
|---|---|---|
| 1,3-butylene glycol | mol | 1 |
| Tris(2-nitrophenyl) phosphite | do | 1 |
| Sodium | gram | 1 |

The process of Example 11 was repeated and 2-(2-nitro)phenoxy-4-methyl-1,3,2-dioxaphosphorinane recovered as the final product.

EXAMPLE 99

| | | |
|---|---|---|
| 2-methyl-2,4-pentanediol | mol | 1 |
| Tris(3-nitrophenyl) phosphite | do | 1 |
| Sodium | gram | 1 |

The process of Example 11 was repeated and 2-(3-nitro)phenoxy - 4,4,6 - trimethyl - 1,3,2 - dioxaphosphorinane recovered as the final product.

EXAMPLE 100

| | | |
|---|---|---|
| 2-methyl-2,4-pentanediol | mol | 1 |
| Tris(4-nitrophenyl) phosphite | do | 1 |
| Sodium | gram | 1 |

The process of Example 11 was repeated and 2-(4-nitro)phenoxy - 4,4,6 - trimethyl - 1,3,2 - dioxaphosphorinane recovered as the final product.

The above specific examples are merely illustrative and are not exhaustive as to the preparation of compounds coming within the instant invention.

We claim:

1. Cyclic phosphites having the formula:

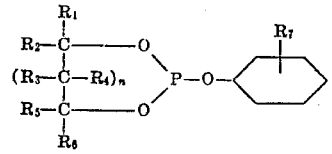

where $R_1$, $R_2$, $R_3$, $R_4$, $R_5$ and $R_6$ are selected from the group consisting of hydrogen and lower alkyl groups, $R_7$ is selected from the group consisting of hydrogen, halo, nitro, lower alkyl, lower alkoxy, cyclohexyl, phenoxy, naphthoxy and phenyl and $n$ is an integer of the group consisting of 0 and 1.

2. A cyclic phosphite according to claim 1 where $n$ is 0.

3. A cyclic phosphite according to claim 1 where $n$ is 1.

4. Compounds according to claim 1 wherein $R_7$ is hydrogen.

5. 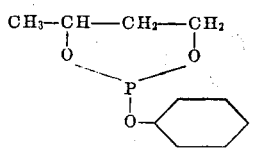

6. 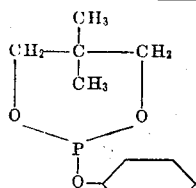

7. 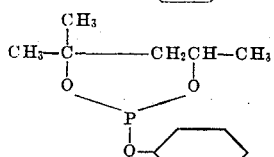

8. 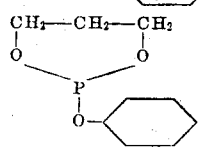

9. 2-phenoxy-1,3,2-dioxaphosphorinane having up to three lower alkyl groups attached to carbon atoms of the dioxaphosphorinane ring.

10. 2-phenoxy-1,3,2-dioxaphosphorinane having 1 to 3 methyl groups attached to carbon atoms of the dioxaphosphorinane ring.

11. 2-phenoxy-1,3,2-dioxaphospholane having as the sole substituents on the dioxaphospholane ring not more than one lower alkyl group attached to each of the carbon atoms of the dioxaphospholane ring.

12. Phenylethylene phosphite having the formula:

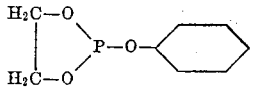

13. 2-phenoxy-1,3,2-dioxaphospholane having as the sole substituents on the dioxaphospholane ring not more than one lower alkyl group attached to each of the carbon atoms of the dioxaphospholane ring and having attached to the phenoxy group a lower alkyl group.

14. 2-phenoxy-1,3,2-dioxaphosphorinane having up to three lower alkyl groups attached to carbon atoms of the dioxaphosphorinane ring and having attached to the phenoxy group a lower alkyl group.

15. A process of preparing a cyclic phosphite having the formula:

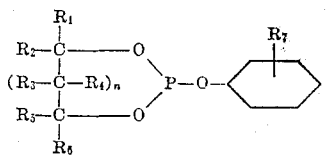

where $R_1$, $R_2$, $R_3$, $R_4$, $R_5$ and $R_6$ are selected from the group consisting of hydrogen and lower alkyl groups, $R_7$ is selected from the group consisting of hydrogen, halo, nitro, lower alkyl, lower alkoxy, cyclohexyl, phenoxy, naphthoxy and phenyl and $n$ is an integer of the group consisting of 0 and 1 comprising reacting 1 mol of a glycol having the formula:

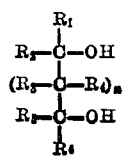

with at least about 1 mol of a phosphite having the formula:

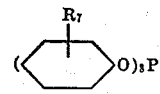

16. A process according to claim 15 wherein the reaction is carried out with the aid of an alkaline catalyst having a pH above 9.

17. A process according to claim 15 wherein $R_7$ is hydrogen.

18. A process according to claim 17 wherein the reaction is carried out in the presence of an alkaline catalyst having a pH above 9.

19. A process according to claim 15 wherein $R_7$ is hydrogen and between 1 and 1.5 mol of the phosphite are employed per mol of glycol.

20. A process of preparing the cyclic phosphite

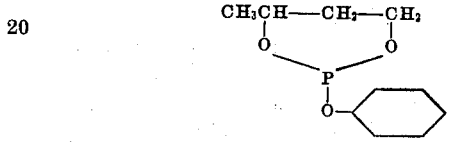

comprising heating 1 mol of 1,3-butylene glycol with at least about 1 mol of triphenyl phosphite in the presence of an alkaline catalyst having a pH above 9.

21. A process of preparing the cyclic phosphite

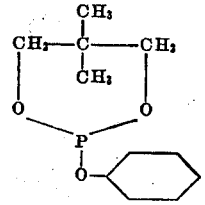

comprising heating 1 mol of neopentyl glycol with at least about 1 mol of triphenyl phosphite in the presence of an alkaline catalyst having a pH above 9.

22. A process of preparing the cyclic phosphite

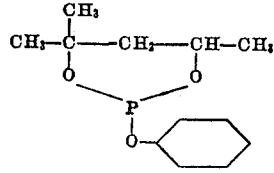

comprising heating 1 mol of 2-methyl-2,4-pentanediol with at least about 1 mol of triphenyl phosphite in the presence of an alkaline catalyst having a pH above 9.

23. A process of preparing phenylethylene phosphite comprising heating 1 mol of ethylene glycol with at least about 1 mol of triphenyl phosphite in the presence of an alkaline catalyst having a pH above 9.

24. A process of preparing a 2-phenoxy-1,3,2-dioxaphospholane comprising reacting 1 mol of a vicinal glycol having not more than one lower alkyl group attached to each hydroxyl group containing carbon atom with at least about 1 mol of triphenyl phosphite.

25. A process of preparing a 2-phenoxy-1,3,2-dioxaphophorinane comprising reacting 1 mol of a glycol having one carbon atom between the carbon atoms attached to the hydroxyl groups, said glycol having up to 3 lower alkyl groups, with at least about 1 mol of triphenyl phosphite.

No references cited.

Disclaimer 2,834,798.—*Ingenuin Hechenbleikner*, Clarksburg, *Carl William Pause*, Adams, and *Francis C. Lanoue*, North Adams, Mass. HETEROCYCLIC PHOSPHORUS COMPOUNDS. Patent dated May 13, 1958. Disclaimer filed Nov. 29, 1963, by the assignee, *Hooker Chemical Corporation*.
Hereby enters this disclaimer to claim 6 of said patent.
[*Official Gazette February 11, 1964.*]